(12) United States Patent
Barns

(10) Patent No.: US 7,918,300 B2
(45) Date of Patent: Apr. 5, 2011

(54) MOTORCYCLE CONVERSION ASSEMBLY

(76) Inventor: Paul Barns, Homer, MI (US)

( * ) Notice: Subject to any disclaimer, the term of this patent is extended or adjusted under 35 U.S.C. 154(b) by 84 days.

(21) Appl. No.: 12/556,166

(22) Filed: Sep. 9, 2009

(65) Prior Publication Data

US 2010/0059302 A1   Mar. 11, 2010

Related U.S. Application Data

(60) Provisional application No. 61/095,427, filed on Sep. 9, 2008.

(51) Int. Cl.
  *B62D 61/12* (2006.01)
  *B62K 13/00* (2006.01)
  *B62H 7/00* (2006.01)

(52) U.S. Cl. .......... 180/209; 180/311; 280/124.128; 280/124.166; 280/293; 280/781

(58) Field of Classification Search ............ 180/209, 180/210, 311; 280/124.128, 124.166, 204, 280/293, 781
See application file for complete search history.

(56) References Cited

U.S. PATENT DOCUMENTS

| | | | | |
|---|---|---|---|---|
| 1,820,190 A * | 8/1931 | Hess | ............... | 280/293 |
| 1,933,102 A | 10/1933 | Du Pont et al. | | |
| 2,712,742 A * | 7/1955 | Neidhart | ............... | 464/83 |
| 3,498,633 A * | 3/1970 | Hopkins | ............... | 280/204 |
| 4,221,276 A * | 9/1980 | Mitchell et al. | ............... | 180/209 |
| 4,287,960 A | 9/1981 | McConnell | | |
| 4,415,056 A * | 11/1983 | Smith | ............... | 180/210 |
| 4,437,676 A * | 3/1984 | Kitrell | ............... | 280/78 |
| 4,461,609 A * | 7/1984 | Zinno | ............... | 414/495 |
| 4,511,155 A * | 4/1985 | Galloway | ............... | 280/204 |
| 4,580,652 A * | 4/1986 | Turner et al. | ............... | 180/210 |
| 4,961,477 A * | 10/1990 | Sweeney | ............... | 180/219 |
| 5,277,450 A * | 1/1994 | Henschen | ............... | 280/6.151 |
| 5,411,287 A * | 5/1995 | Henschen | ............... | 280/124.169 |
| 5,529,141 A | 6/1996 | Lehman et al. | | |
| 6,155,368 A | 12/2000 | Mullins | | |
| 6,494,283 B1 | 12/2002 | Mullins | | |
| 6,739,420 B2 | 5/2004 | Mullins | | |
| 6,752,411 B2 * | 6/2004 | Few | ............... | 280/124.169 |
| 6,932,388 B2 * | 8/2005 | Few et al. | ............... | 280/787 |
| 6,957,825 B2 * | 10/2005 | Peters | ............... | 280/483 |
| 7,419,024 B1 * | 9/2008 | Tavantzis | ............... | 180/210 |
| 2008/0283320 A1 * | 11/2008 | Bowles et al. | ............... | 180/210 |

* cited by examiner

*Primary Examiner* — Paul N Dickson
*Assistant Examiner* — Joseph Rocca
(74) *Attorney, Agent, or Firm* — Price, Heneveld, Cooper, DeWitt & Litton, LLP

(57) ABSTRACT

A motorcycle conversion assembly for a motorcycle comprising first and second side members and first and second cross members to thereby define a rigid frame. The motorcycle conversion assembly further comprises first and second frame plates operably coupled to the frame and first and second axle plates operably coupled and rotatably adjustable relative to the first and second frame plates. The motorcycle conversion assembly further comprises first and second torsion adjustment assemblies, which are used to adjust the torsion acting on wheel assemblies when the motorcycle conversion assembly is operably connected to a motorcycle.

15 Claims, 9 Drawing Sheets

MOTORCYCLE CONVERSION ASSEMBLY

CROSS-REFERENCE TO RELATED APPLICATIONS

This application claims priority under 35 U.S.C. §119(e) and the benefit of U.S. Provisional Application No. 61/095,427 entitled MOTORCYCLE CONVERSION ASSEMBLY, filed on Sep. 9, 2008, by Paul Barns. the entire disclosure of which is incorporated herein by reference.

BACKGROUND OF THE INVENTION

Generally, motorcycles have become an iconic part of the American culture and serve as a means for individualistic expression for the motorcycle owner. Unfortunately, the nature of the conventional two-wheel motorcycle often does not have the required stability and ease of operation that may be needed for a disabled motorcycle enthusiast or an elderly rider looking to extend his or her time on their motorcycle. In the past, a variety of three-wheel motorcycles and conversion kits have been proposed to help add the stability and ease of operation needed for particular groups of riders. While several variations of the aforementioned theme have been employed in the art, no art known to Applicant discloses a motorcycle conversion assembly that may be readily bolted to an existing unmodified motorcycle which allows for precise adjustment of the wheel assemblies, provides means for hiding the conversion assembly framework, can remain on the motorcycle without the wheel assemblies for use in attachment of different accessories and provides the strength and rigidity needed in the framework to handle high speed transport.

SUMMARY OF THE INVENTION

The present invention generally relates to a motorcycle conversion assembly, and more particularly, to a motorcycle conversion assembly that is modular and adjustable for use with an existing unmodified motorcycle. The motorcycle conversion assembly makes it possible to convert a conventional two-wheel motorcycle into a motorcycle having the look and the stability of a tricycle-type vehicle.

These and other features, objects and advantages of the present invention will become apparent upon reading the following description thereof together with reference to the accompanying drawings.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 2:
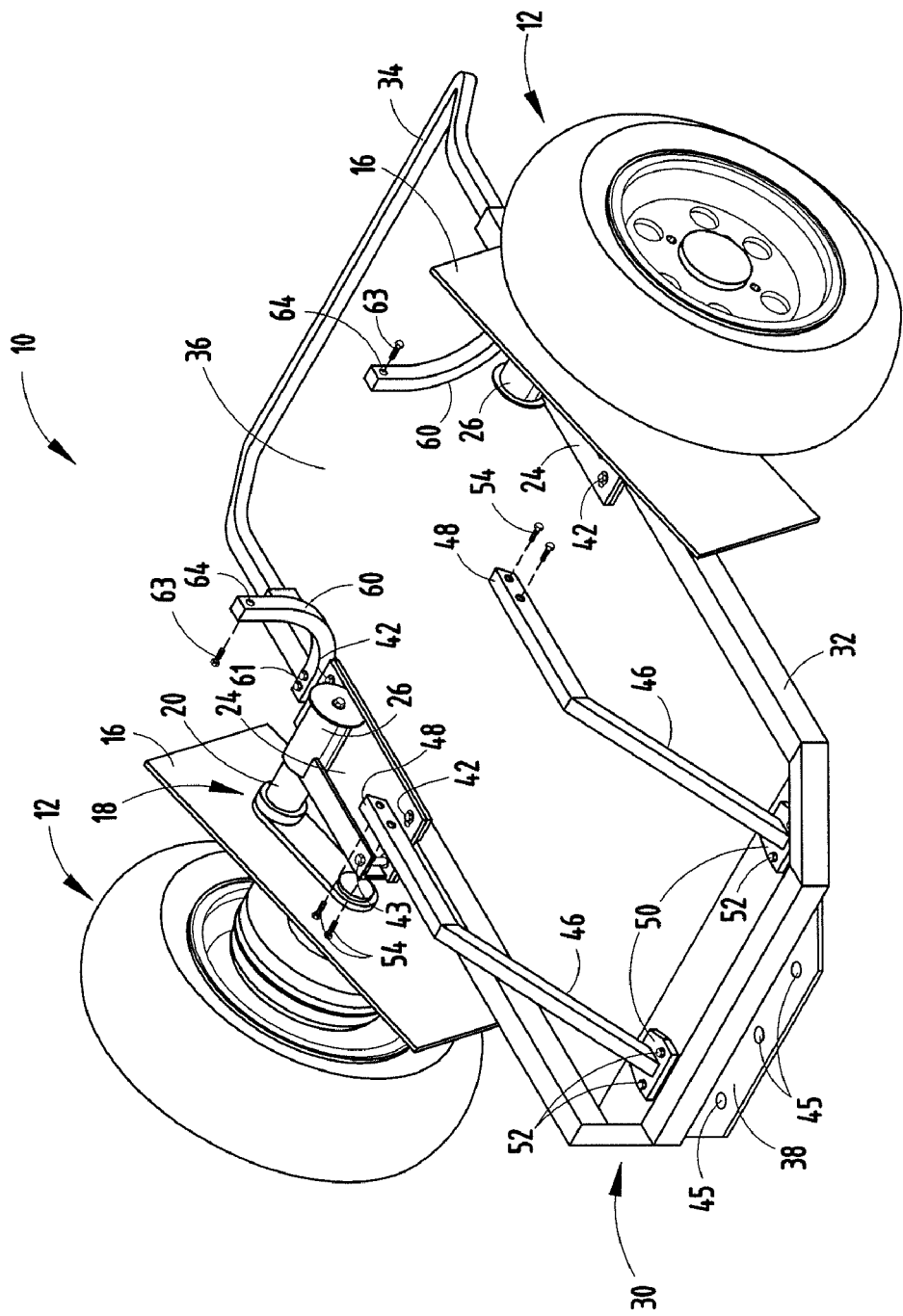
FIG. 2 is a perspective view of a motorcycle conversion assembly in accordance with one embodiment of the present invention.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments. Hence, specific dimensions and other physical characteristics relating to the embodiments disclosed herein are not to be construed as limiting, unless expressly state otherwise.

Figure 1:
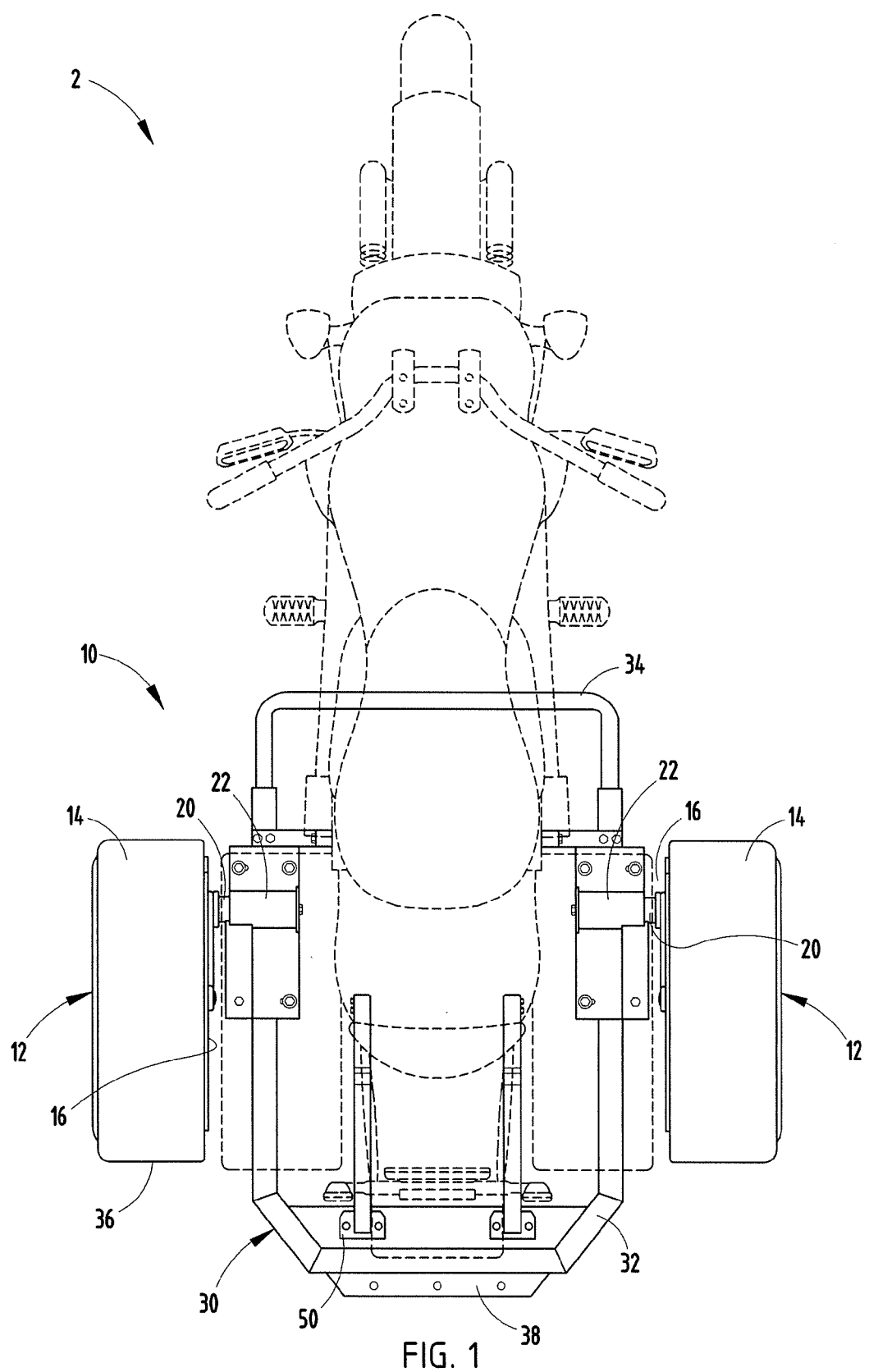
FIG. 1 is a top plan view of a motorcycle conversion assembly attached to a motorcycle in accordance with one embodiment of the present invention.
Figure 3:
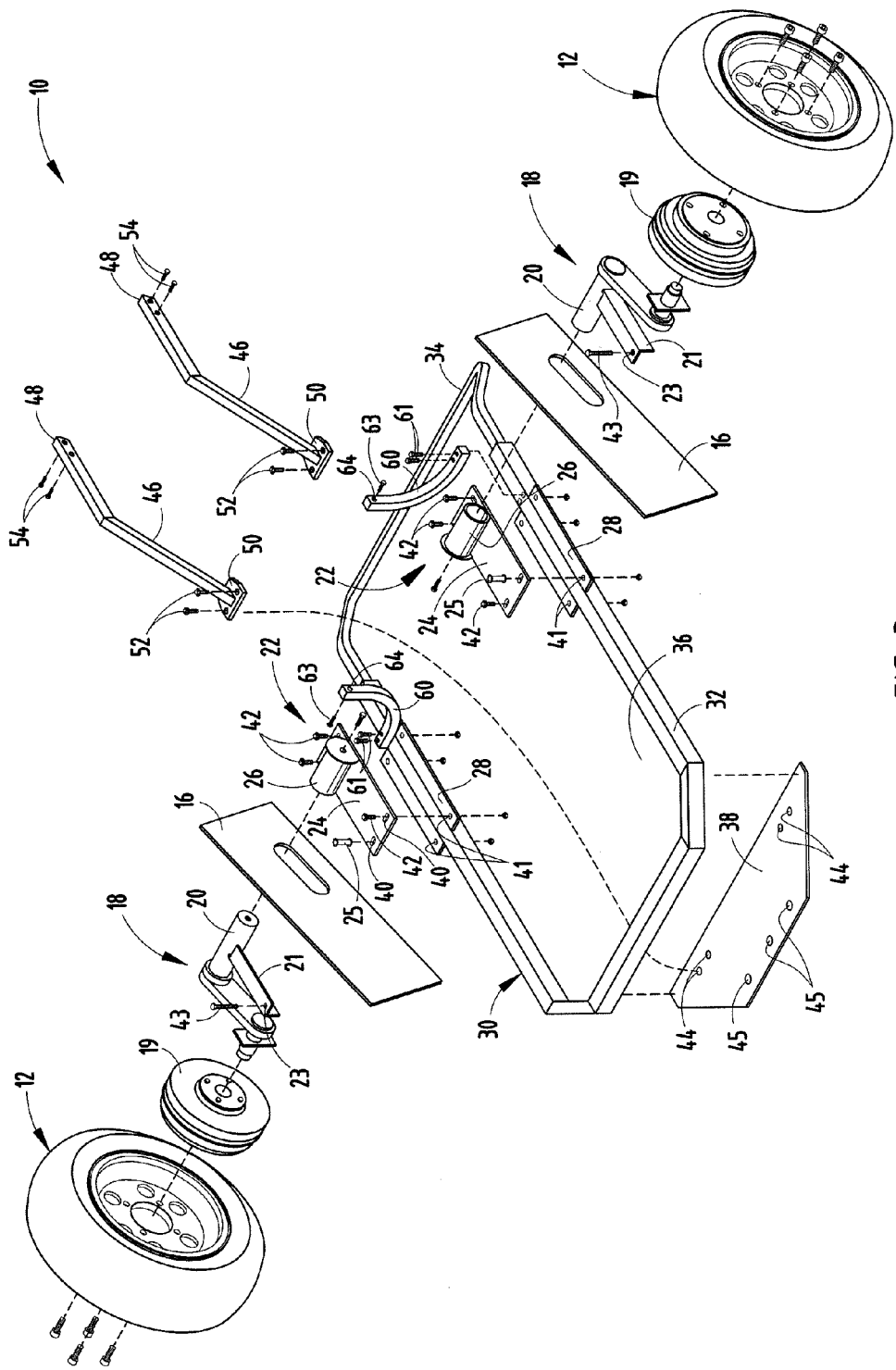
FIG. 3 is an exploded perspective view of a motorcycle conversion assembly in accordance with one embodiment of the present invention.

In regards to FIG. 1, a motorcycle conversion assembly is generally shown at reference identifier 10. The conversion assembly 10 is shown attached to a motorcycle 2 in FIG. 1. In one embodiment of the present invention, the conversion assembly 10 includes wheel assemblies 12 disposed in a generally parallel, laterally spaced-apart relationship. The wheel assemblies 12 are covered by fender assemblies 14 which are attached to fender mounting plates 16 which are disposed above torsion axles 18 which are commercially available from Northern Tool and Equipment. As shown in FIG. 3, the wheel assemblies 12 attach to the torsion axles 18 with wheel hubs 19. The torsion axles 18 have cylinder-shaped end pieces 20 which sleeve into adjustable torsion axle mounting assemblies 22, as shown in FIGS. 1 and 3. The torsion axle mounting assemblies 22 comprise axle plates 24 and tube-like portions 26 for accepting the cylinder-shaped ends 20 of the torsion axles 18. The torsion axle mounting assemblies 22 further comprise mating square-shaped frame plates 28 connected with an overall framework 30 of the assembly 10. Thus, the torsion axle mounting assemblies make for independent torsion adjusters in assembly.

As shown in FIG. 3, in one embodiment of the present invention, the axle plates 24 of the torsion axle mounting assemblies 22 have a series of fastener apertures 40 which mate with fastener apertures 41 on the frame plates 28 of the torsion axle mounting assemblies 22. Some of the fastener apertures 40 on axle plates 24 are of an oblong shape which allows for the adjustment of the axle plates 24 relative to the frame plates 28 of the torsion axle mounting assemblies 22. Axle plates 24 attach to frame plates 28 via fasteners 42, as shown in FIG. 3.

Referring again to FIG. 3, in another embodiment of the present invention, the torsion axles 18 further include L-shaped flanges 21 disposed off of the cylindrical ends 20 of the torsion axles 18. Fasteners 43 are used to go through apertures 23 disposed at the end of the L-shaped flanges 21 and then through spacers 25 and through the axle plates 24 of the torsion axle mounting assemblies 22. Different spacers 25 can be used with the L-shaped flanges 21 to adjust the degree of torsion acting on torsion axles 18.

Figure 4:
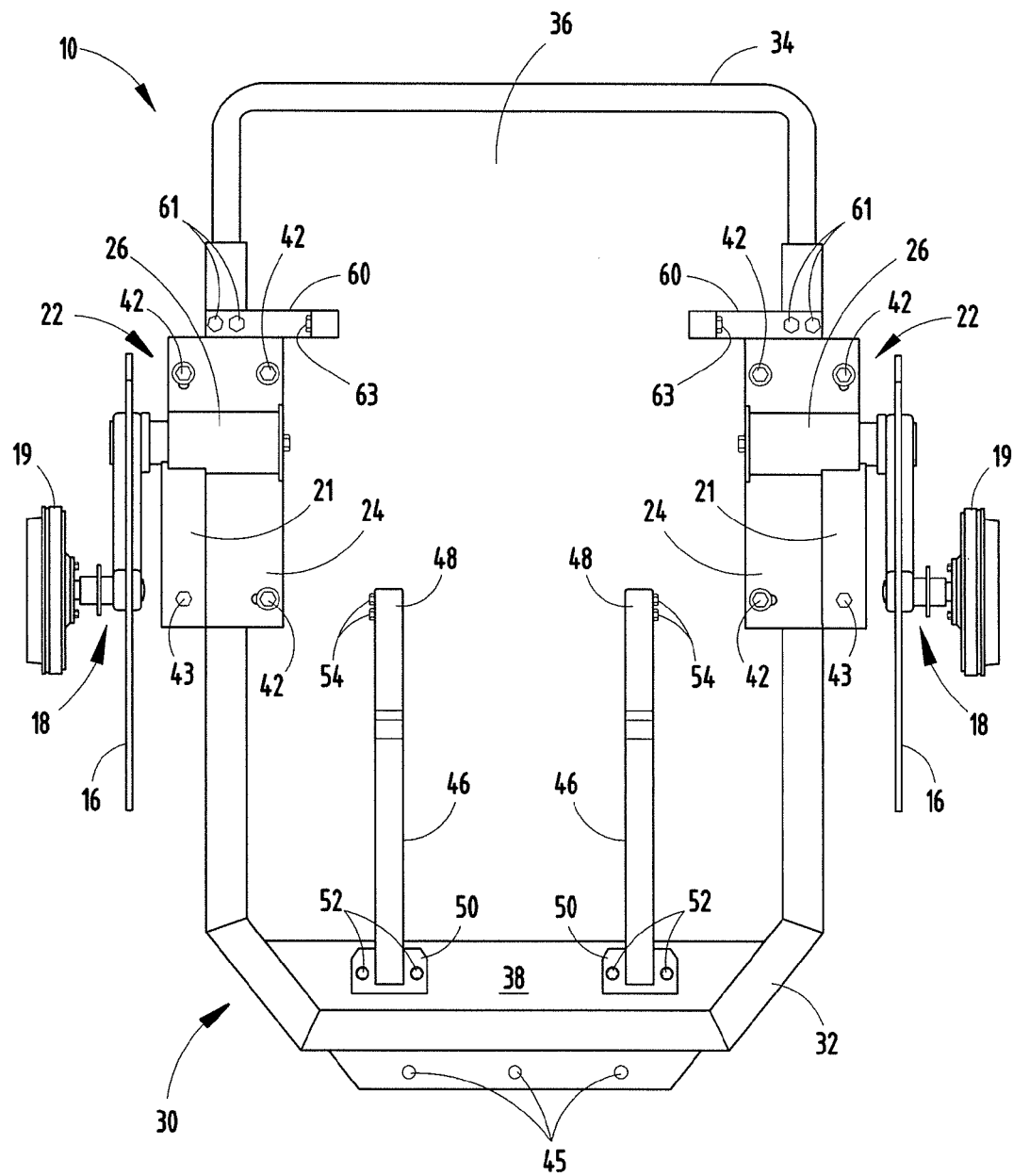
FIG. 4 is a top elevational view of a motorcycle conversion assembly in accordance with one embodiment of the present invention.
Figure 5:
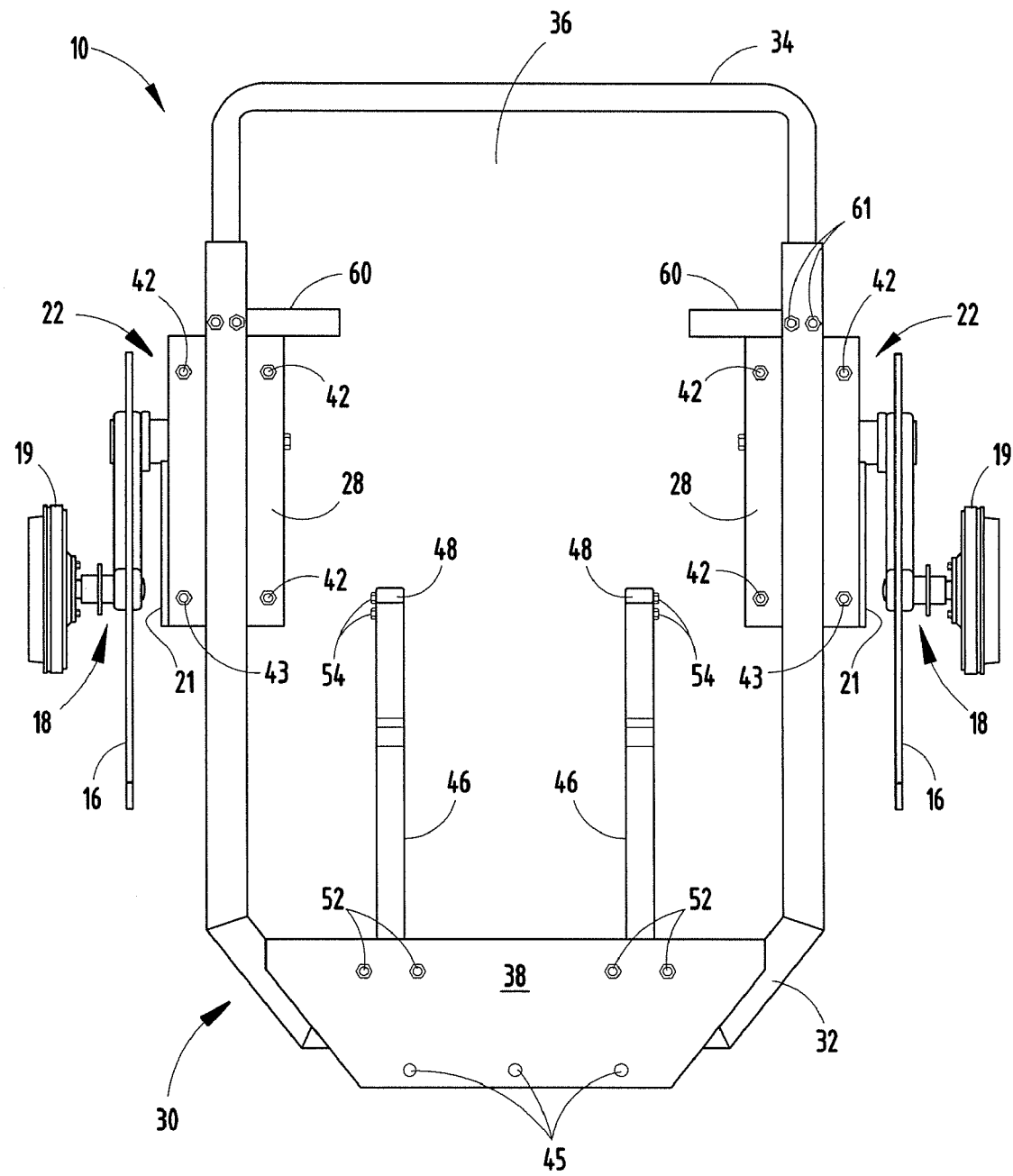
FIG. 5 is a bottom plan view of a motorcycle conversion assembly in accordance with one embodiment of the present invention.

As shown in FIGS. 4 and 5, in one embodiment of the present invention, the framework 30 includes two main components. The first component is a generally U-shaped member 32 with the second component being a U-shaped member 34 which sleeves into U-shaped member 32, thus providing a rigid framework having first and second side members as well as first and second cross members. In assembly, the U-shaped components 32 and 34 come together to provide a pocket 36 for the rear wheel of an unmodified motorcycle 2 to be inserted. In assembly, the U-shaped member 34 is disposed at the front of the framework 30 with the U-shaped member 32 disposed in the rear. The U-shaped member 32 further comprises a plate 38 which is welded to the frame member 32 which provides support for motorcycle mounting brackets as described in further detail below.

Referring again to FIGS. 2 and 3, plate 38 is attached to frame member 32 by conventional means such as bolts or welding. Plate 38 further has apertures 44 which are used to receive motorcycle bracket assemblies. Angled bracket assemblies 46 comprise motorcycle mounting points 48 and plates 50 for mounting the angled brackets 46 to frame plate 38. In assembly, the angled brackets 46 are mounted to frame plate 38 at apertures 44 using fasteners 52. Once in place on the framework 30, the angled brackets 46 are then mounted to the motorcycle 2 at points 48 using fasteners 54. The angled brackets 46 mount to the frame of the motorcycle 2 at point 48 at a location on the motorcycle 2 suited to support motorcycle conversion assembly 10.

The framework 30 further includes curve-shaped motorcycle bracket assemblies 60 which have apertures and fasteners 61 at the lower ends 62, as well as apertures and fasteners 63 at the upper ends 64, for attachment to the motorcycle 2. The curved brackets 60 attach to the framework 30 at the lower ends 62 and attach to the motorcycle 2 using apertures and fasteners at the upper ends 64 at a suitable point on the motorcycle 2 for supporting the motorcycle conversion assembly 10. The motorcycle brackets 60 and 46 are attached to the motorcycle 2 using fasteners that are easily removed to release the conversion assembly 10 from the motorcycle 2.

In another embodiment of the present invention, plate 38 further comprises apertures 45 for attachment of a ball hitch receiver and safety chains for attachment of a trailer (not shown) to the motorcycle conversion assembly 10.

In yet another embodiment of the present invention, the wheel assemblies 12 can be removed from the motorcycle conversion assembly 10 such that the frame 30 can be used to pull a trailer without the need for the wheel assemblies 12.

In another embodiment of the present invention, the motorcycle 2 can be outfitted with saddle bags as indicated by dotted lines in FIG. 1 such that the framework 30 is virtually hidden to the viewer.

In yet another embodiment of the present invention, the torsion axles 18 can be adjusted independently from one side to another using the torsion axle bracket assemblies 22 and adjusting the down pressure on torsion axles 18 by adjusting the size of spacers 25 disposed underneath the L-shaped flanges 21 stemming from the cylinder-like end pieces 20 of the torsion axles 18. The independent adjustment of the torsion axles provides for a smoother ride when the motorcycle conversion assembly 10 is attached and used on a motorcycle 2.

The fender assemblies 14 are attached to fender mounting plates 16 which are mounted on torsion axles 18. In one embodiment of the present invention, the fender assemblies 14 move with the wheel assemblies 12 on the axis of the torsion axle 18 thus adding to the smoother ride and homogony of the system in travel.

Figure 6:
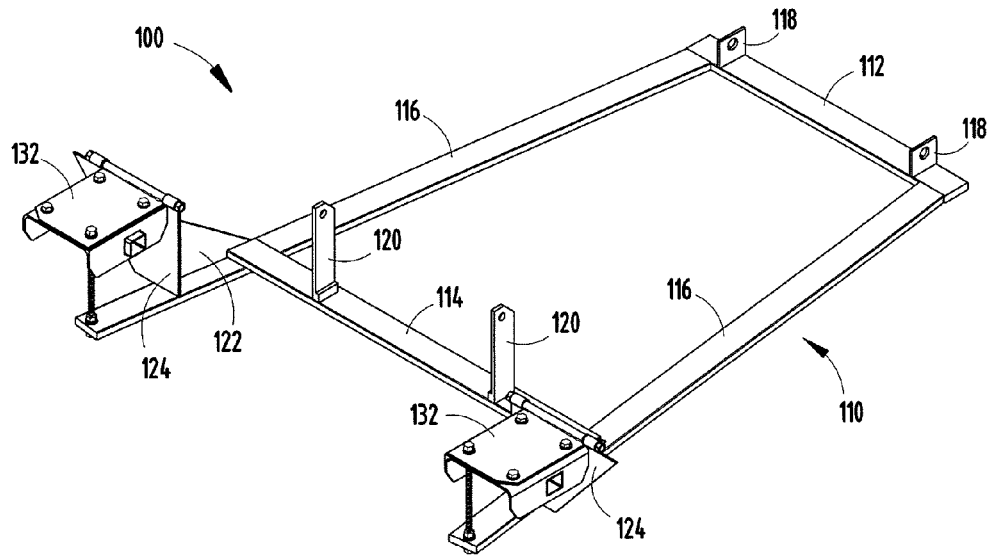
FIG. 6 is a perspective view of a motorcycle conversion assembly in accordance with another embodiment of the present invention.
Figure 7:
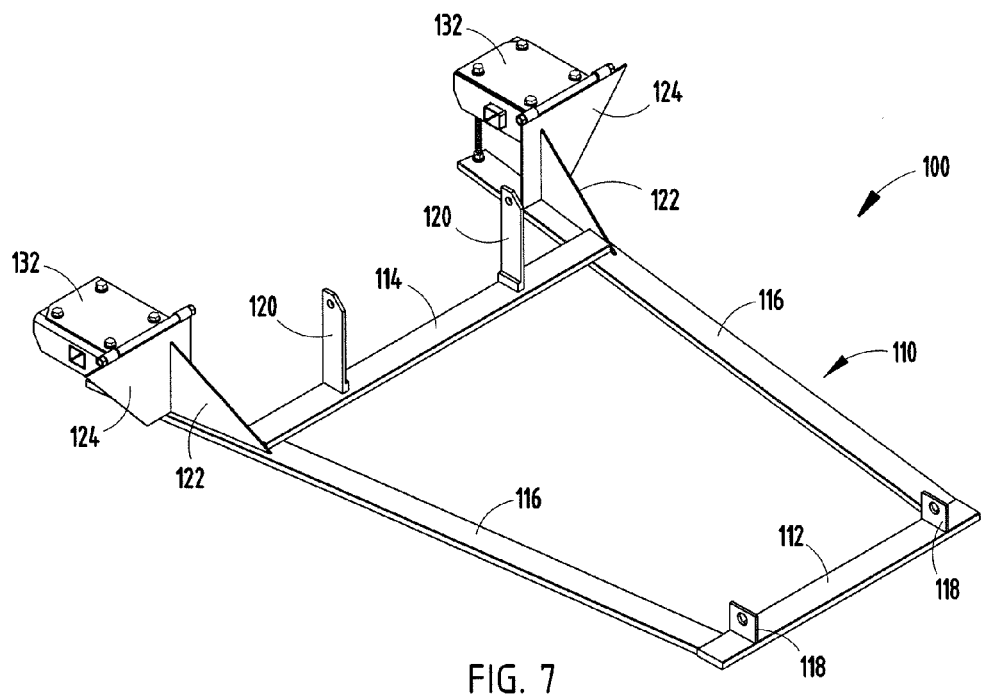
FIG. 7 is a perspective view of a motorcycle conversion assembly in accordance with the present invention.

Referring to FIG. 6, in yet another embodiment of the present invention, a motorcycle conversion assembly is generally shown by reference identifier 100. The conversion assembly 100 is generally comprised of a frame 110, which is made of a front cross member 112, a rear cross member 114, and two side members 116. As shown in FIGS. 6 and 7, the front cross member 112 further comprises brackets 118 for attaching the front end of the frame 110 to a motorcycle (not shown). The rear cross member 114 of frame 110 further comprises brackets 120 which are used to attach the rear of the frame 110 to a motorcycle in assembly. Plates 122 are attached to the frame 110 at the intersection of side members 116 and rear cross member 114 and further attach to vertical plates 124.

Figure 8:
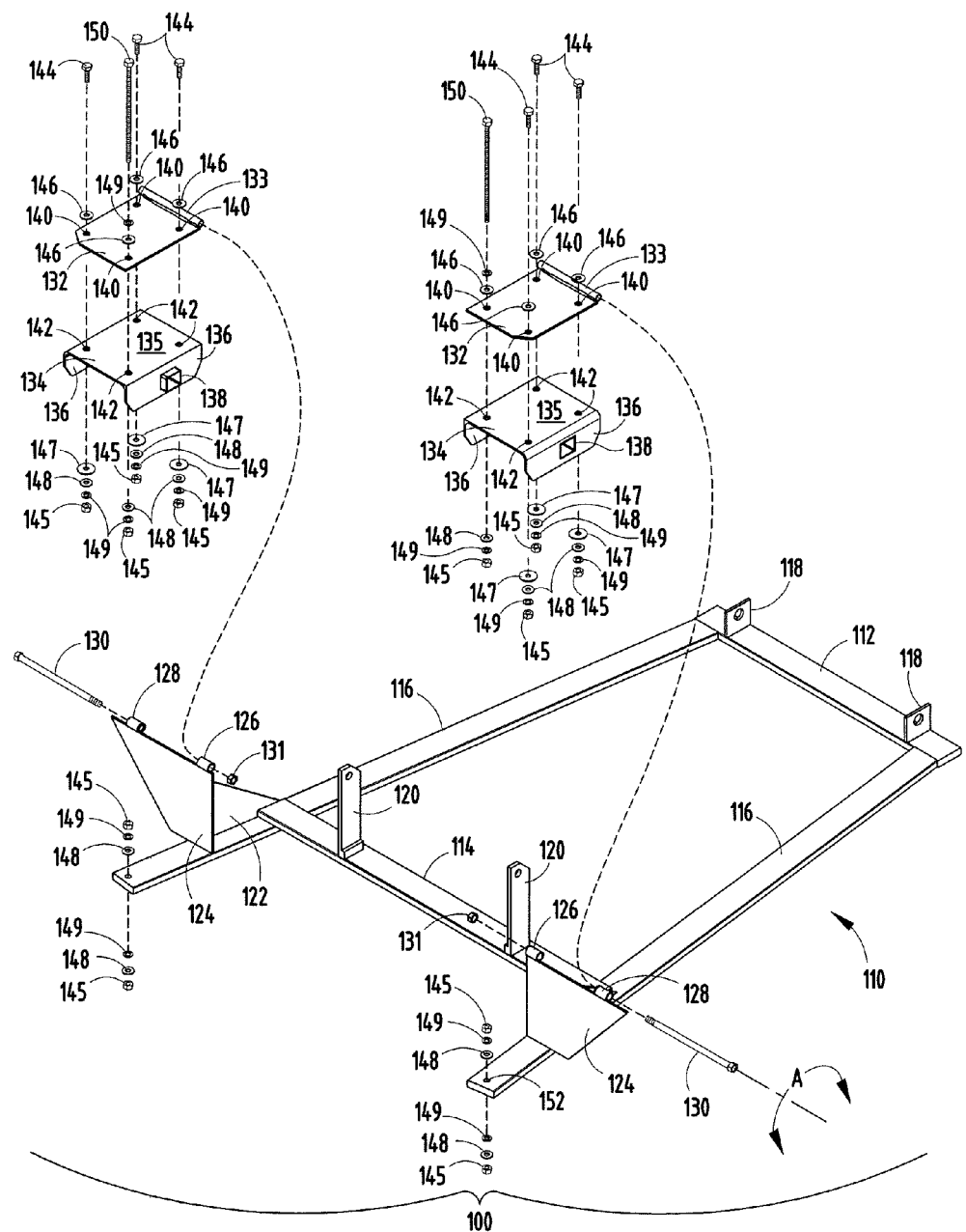
FIG. 8 is an exploded perspective view of a motorcycle conversion assembly in accordance with the present invention.

As shown in FIG. 8, vertical plates 124 further comprise inner cylinders 126 and outer cylinders 128 disposed at the top front edges of plates 124. Inner cylinders 126 and outer cylinders 128 are used to house a bolt 130 in assembly. Vertical plates 124 attach to frame plates 132 which further attach to axle plates 134. The frame plates 132 further comprise cylinders 133 which, in assembly, fit in between inner cylinders 126 and outer cylinders 128 of vertical mounting plates 124. Thus, in assembly, the vertical mounting plates 124 and frame plates 132 are connected in a pivotal relationship around a pivot point A, which pivots around bolt 130, which is positioned through outer cylinders 128 of the vertical mounting plates 124, through cylinders 133 of frame plates 132 and finally through inner cylinders 126 of vertical mounting plates 124 where it is then fixed in place by nut 131.

As shown in FIG. 8, the frame plates 132 have four apertures 140. Axle plates 134 further comprise apertures 142 which align with apertures 140 of frame plates 132 in assembly. Axle plates 134 are U-shaped mounting assemblies having horizontal face plates 135 and vertical downturned portions 136 on either side of the horizontal face plates 135. Square tubes 138 are disposed between downturned portions 136 of the axle plates 134, and the square tubes 138 are used to mount torsion axles of the wheel assemblies (not shown). The torsion axles are similar to torsion axles 18, as shown in FIG. 3, but, instead of having a cylinder-shaped end piece 20, the torsion axles have a square-shaped end piece which sleeves into the square-shaped tubes 138.

Frame plates 132 and axle plates 134 are connected by fasteners 144 which are secured in place by nuts 145. The fasteners 144 pass through washers 146 before passing through apertures 140 and 142. The washers 146 are used since apertures 140 are larger than normal apertures which allow for rotational adjustment of the frame plates 132 and axle plates 134 when the motorcycle conversion assembly 100 is fully assembled. Fasteners 144 then pass through the axle plates 134 and then through washers 147 which serve a similar purpose as to washers 146. Spacers and seals 148 and 149 are also used to hold fasteners 144 in place after final adjustments have been made.

Figure 10:
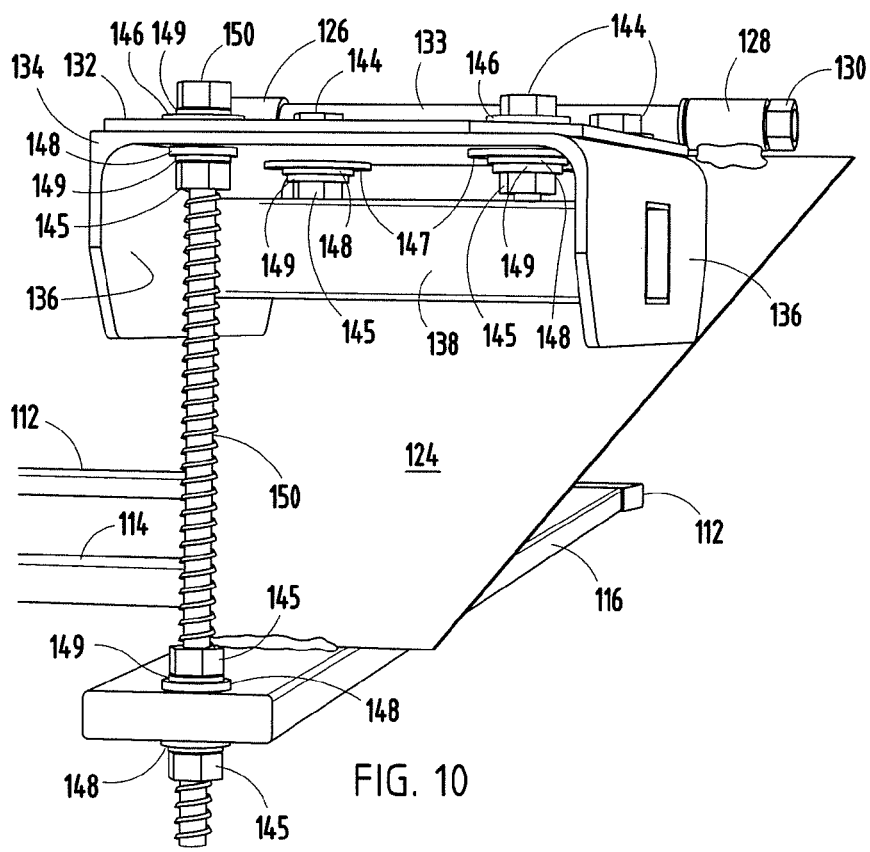
FIG. 10 is a fragmentary perspective view of a motorcycle conversion assembly in accordance with the present invention.

Torsion adjusters 150 are disposed through frame plates 132 and axle plates 134 and further span the distance between axle plates 134 to the side members 116 on the frame 110 to which they attach. The torsion adjusters 150 use similar spacers and seals as found on fasteners 144. The torsion adjusters 150 pass through the frame plates 132 and through the axle plates 134 in assembly. Similar nuts, washers, and seals, as described for fasteners 144, are also used for the torsion adjusters 150 on either side of the torsion adjusters 150 as they pass through apertures 152 of side members 116 of frame 110. As shown in FIG. 10, the torsion adjusters 150 can be adjusted by driving the torsion adjusters 150 through the apertures 152 of side members 116 of frame 110 to increase the degree of torsion acting on the torsion axles (not shown). The further the torsion adjusters 150 are driven through apertures 152 of side members 116 of frame member 110, the higher the degree of torsion acting on the torsion axles. By independently adjusting the torsion adjusters 150, the frame plates 132, the axle plates 134, and the pivot point A rotating about bolts 130, the end user can customize the ride and feel of the conversion assembly 100.

Figure 9:
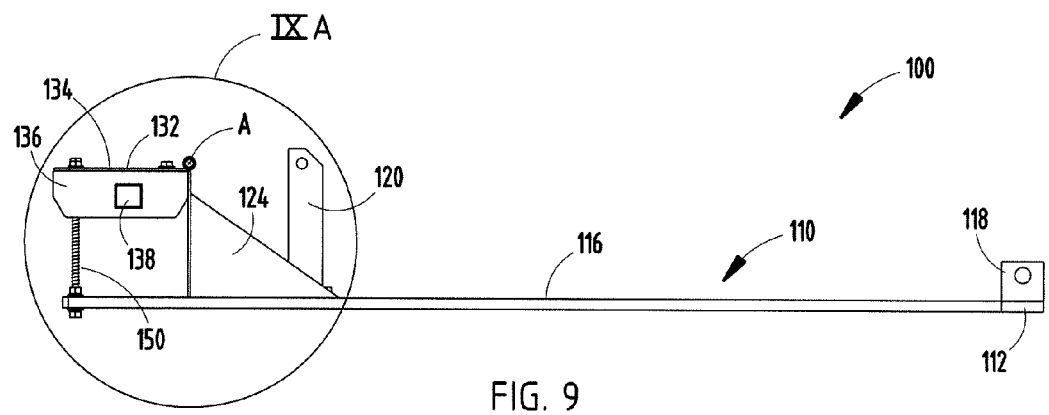
FIG. 9 is a side elevational view of a motorcycle conversion assembly in accordance with the present invention.
Figure 9A:
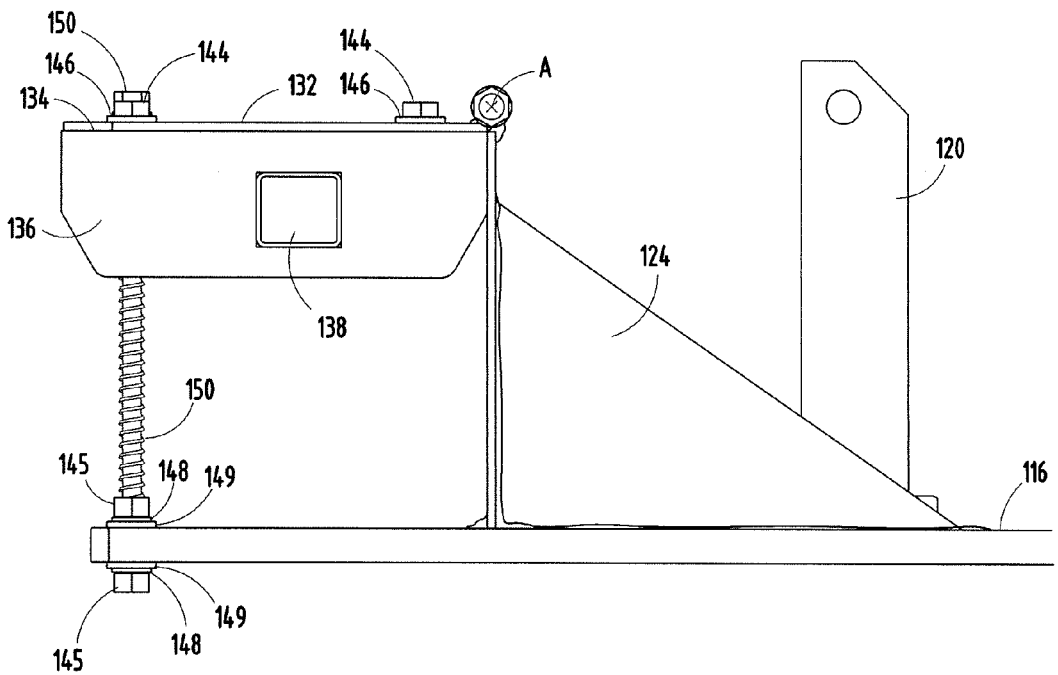
FIG. 9A is a fragmentary side elevational view of a motorcycle conversion assembly in accordance with the present invention.

As shown in FIGS. 9 and 9A, the torsion adjuster 150 shown is fully extended. As such, the least amount of torsion would be acting on the torsion axle in this configuration.

As shown in FIG. 10, the torsion adjuster 150 is partially driven through side member 116 of frame 110. Thus, the degree of torsion acting on the torsion axle is increased.

Figure 11:
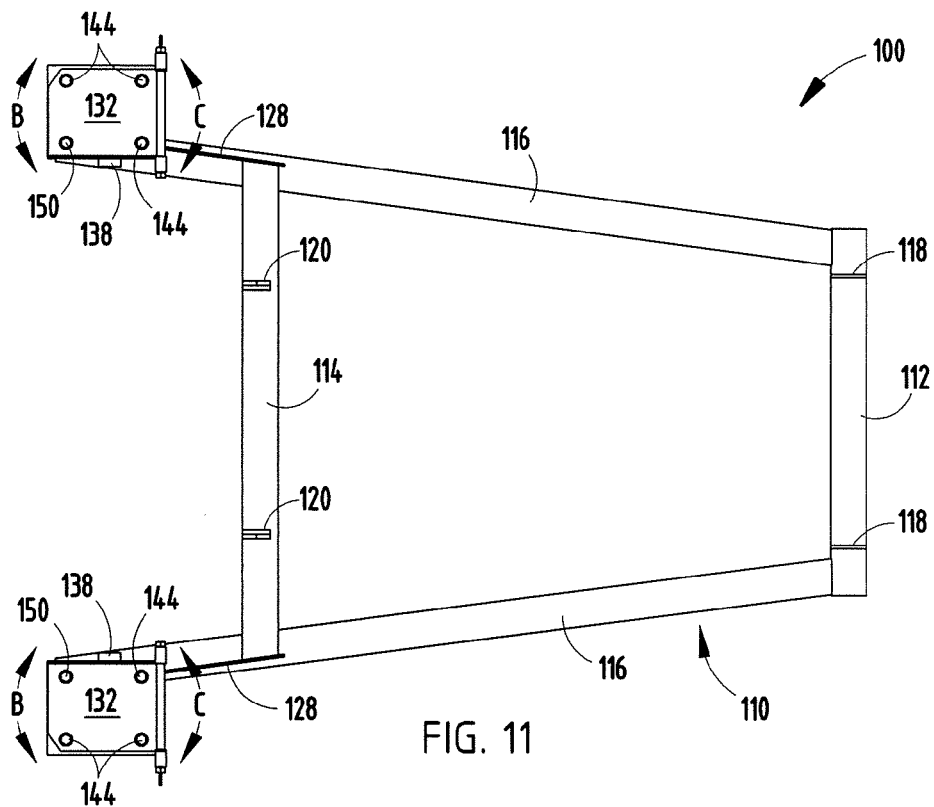
FIG. 11 is a top plan view of a motorcycle conversion assembly in accordance with the present invention.

As shown in FIG. 11, the axle plates 134 can be adjusted as indicated by arrows B and C in order to assure the wheel assemblies (not shown) are straight and parallel with the wheel assembly of the motorcycle (not shown). By adjusting the axle plates 134 and by adjusting the torsion adjusters 150 of motorcycle conversion assembly 100, the user can right any unforeseen inconsistencies with the motorcycle conversion assembly 100 or the motorcycle frame as attached to the motorcycle conversion assembly 100. The adjustment of the frame plates 132 and axle plates 134 ensures that the wheel assemblies are in the correct position to reduce wear and tear on the wheel assemblies and the torsion axle when in use. The adjustment of the torsion adjusters 150 will insure a smoother custom ride for the end user when the motorcycle conversion assembly 100 is attached and used on a motorcycle. All adjustments to the frame plates 132 and the axle plates 134 can be made independent of each other to insure that each component is properly adjusted with regard to the wheel assembly to which it is attached. The torsion adjusters 150 also operate independently of each other to fine tune each wheel assembly as needed by the end user.

The above description is considered that of the preferred embodiments only. Modifications of the invention will occur to those skilled in the art and to those who make or use the invention. It is understood, therefore, that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A motorcycle conversion assembly, comprising:
   first and second side members disposed in a laterally spaced-apart relationship;
   first and second cross members operably connected to the first and second side members to thereby define a rigid frame;
   first and second frame plates operably connected to the frame;
   first and second axle plates operably coupled to and rotatably adjustable with the first and second frame plates; and
   first and second torsion adjusting assemblies operably connected to first and second axle plates.

2. A motorcycle conversion assembly as set forth in claim 1, wherein said second cross member is a rear cross member having an accessory plate operably coupled thereto.

3. A motorcycle conversion assembly as set forth in claim 2, wherein said accessory plate further comprises apertures for mounting accessories.

4. A motorcycle conversion assembly as set forth in claim 2, wherein said accessory plate further comprises supports for operably coupling the accessory plate to a motorcycle frame.

5. A motorcycle conversion assembly as set forth in claim 1, wherein said torsion adjusting assemblies comprise a flange and a spacer operably connected to the first and second axle plates.

6. A motorcycle conversion assembly as set forth in claim 5, wherein said torsion adjusting assemblies are adjustable relative to the spacer.

7. A motorcycle conversion assembly as set forth in claim 5, wherein said first and second torsion adjusting assemblies are also operably connected to said first and second frame plates.

8. A motorcycle conversion assembly as set forth in claim 1, wherein said first and second axle plates are rotatably adjusted relative to the first and second mounting plates by loosening one or more fasteners connecting the first and second axle plates to the first and second mounting plates and rotating either the first and second axle plates or the first and second mounting plates relative to each other.

9. A motorcycle conversion assembly as set forth in claim 1, wherein said first and second axle plates are independently adjustable relative to each other.

10. A motorcycle conversion assembly as set forth in claim 1, wherein said first and second torsion adjusting assemblies are independently adjustable relative to each other.

11. A motorcycle conversion assembly, comprising:
    first and second side members disposed in a laterally spaced-apart relationship;
    first and second cross members operably connected to the first and second side members to thereby define a rigid frame;
    first and second axle plates operably coupled to and rotatably adjustable with the rigid frame; and
    first and second torsion adjusting assemblies operably connected to the first and second mounting plates.

12. A motorcycle conversion assembly as set forth in claim 11, wherein said first and second torsion adjusting assemblies are independently adjustable relative to each other.

13. A motorcycle conversion assembly as set forth in claim 12, wherein said torsion adjusting assemblies are also operably connected to a first frame plate and a second frame plate.

14. A motorcycle conversion assembly as set forth in claim 13, wherein said torsion adjusting assemblies comprise mechanical fastener assemblies that can be adjusted to control torsion and is operably coupled to the rigid frame.

15. A method of making a motorcycle conversion assembly, comprising:
    providing first and second side members;
    providing first and second cross members;
    operably connecting first and second side members to the first and second cross members to thereby define a rigid frame;
    providing first and second frame plates;

operably connecting first and second frame plates to the frame;

providing first and second axle plates;

operably coupling first and second axle plates to the first and second mounting plates in rotatably adjustable relationship;

providing first and second torsion adjusting assemblies; and operably connecting first and second torsion adjusting assemblies to the first and second axle plates.

* * * * *